(12) United States Patent
King et al.

(10) Patent No.: US 6,808,325 B2
(45) Date of Patent: Oct. 26, 2004

(54) KEYBOARD WITH AN INTERNAL PRINTER

(75) Inventors: Tobin Allen King, Balmain (AU); Kia Silverbrook, Balmain (AU)

(73) Assignee: Silverbrook Research PTY LTD, Balmain (AU)

( * ) Notice: Subject to any disclaimer, the term of this patent is extended or adjusted under 35 U.S.C. 154(b) by 0 days.

(21) Appl. No.: 10/666,119

(22) Filed: Sep. 22, 2003

(65) Prior Publication Data

US 2004/0062590 A1 Apr. 1, 2004

Related U.S. Application Data

(63) Continuation of application No. 09/966,293, filed on Sep. 28, 2001, now Pat. No. 6,641,315, which is a continuation-in-part of application No. 09/112,767, filed on Jul. 10, 1998, now Pat. No. 6,416,167.

(30) Foreign Application Priority Data

Jul. 15, 1997 (AU) ............................................. PO7991
Mar. 25, 1998 (AU) ............................................. PO2592

(51) Int. Cl.[7] ................................................. B41J 5/28
(52) U.S. Cl. .......................... 400/472; 400/489; 400/88
(58) Field of Search ................................. 400/472, 489, 400/88

(56) References Cited

U.S. PATENT DOCUMENTS

| | | | |
|---|---|---|---|
| 5,188,464 A | | 2/1993 | Aaron |
| 5,322,269 A | * | 6/1994 | Fukube et al. ............. 271/18.1 |
| 5,349,905 A | * | 9/1994 | Taylor et al. ............... 101/488 |
| 5,579,092 A | * | 11/1996 | Isobe et al. .................... 399/39 |
| 5,659,345 A | | 8/1997 | Altendorf |
| 5,666,141 A | | 9/1997 | Matoba et al. |
| 5,719,604 A | | 2/1998 | Inui et al. |
| 5,845,144 A | | 12/1998 | Tateyama et al. |
| 6,155,669 A | | 12/2000 | Donahue et al. |
| 6,158,906 A | | 12/2000 | Simon et al. |
| 6,312,099 B1 | * | 11/2001 | Hawkins et al. .............. 347/42 |
| 6,416,167 B1 | | 7/2002 | Silverbrook |

FOREIGN PATENT DOCUMENTS

| | | |
|---|---|---|
| DE | 19516997 A1 | 5/1994 |
| DE | 19623620 A1 | 6/1995 |
| EP | 0706893 B1 | 4/1996 |
| EP | 0 713774 A2 | 5/1996 |
| JP | 2-92643 A | 4/1990 |
| JP | 2-108544 | 4/1990 |
| JP | 2-265752 A | 10/1990 |
| JP | 404001051 A | 1/1992 |
| JP | 4-353458 A | 12/1992 |
| JP | 051108278 A | 4/1993 |
| JP | 6-91865 A | 4/1994 |
| JP | 6-91866 A | 4/1994 |
| WO | WO 95/10810 | 4/1995 |

OTHER PUBLICATIONS

U.S. patent application Ser. No. 09/966,293, King et al., filed Apr. 18, 2002.
* "ABLEDATA Database of Assistive Technoloyg", Feb. 1999 p2–3 shows Positron Express keyboard/printer.
* Enhanced Communications website showing Positron Express keyboard/printer,Copyright 1997–2000.
* http://web.archive.org/web/20020819212351re—/http://www.enhancedcom.net/positronexpress.asp.
* TTD Products for PSAPS (Larson) Mar./Apr. 1997 from 9–11 Magazine.
Note: Establishes that "Positron Express" keyboard integrated with printer was known in 1997.
* English Traslation of JP 05108278 A.

* cited by examiner

Primary Examiner—Charles H. Nolan, Jr.

(57) ABSTRACT

A keyboard which includes a housing that defines a media feed path. A pagewidth printer is arranged in the housing operatively with respect to the media feed path to carry out a printing operation on media passing through the feed path. A feed mechanism is arranged on the housing for feeding media through the feed path.

5 Claims, 3 Drawing Sheets

KEYBOARD WITH AN INTERNAL PRINTER

This is a continuation application of U.S Ser. No. 09/966,293 filed on Sep. 28, 2001, now U.S. Pat. No. 6,641,315 which is a continuation-in-part of U.S. Ser. No. 09/112,767 filed Jul. 10, 1998, now U.S. Pat. No. 6,416,167.

TITLE OF THE INVENTION

A Keyboard with and Internal Printer

1. Field of Invention

This invention relates to a keyboard. More particularly, the invention relates to a keyboard with an internal printer and to a computer.

2. Background to the Invention

Printers for use with computers can be relatively expensive devices. Accordingly, in a work environment, it is common for a plurality of workstations to be serviced by a single printer station with the computers of those workstations communicating with the printer.

This necessitates people at the workstation having to get up and collect their documents from the printer which can be time wasting. Often, all that is required is a single sheet of paper, for example, where a letter is to be generated or where an image is to be viewed and a hard copy of the image is required.

Desktop inkjet printers are available at low cost, but typically take up substantial desk space. Incorporation of the printing function in a desktop computer keyboard frees up this desk space.

While it is technically possible to incorporate a scanning ink jet printer into a keyboard, this has several disadvantages, including excess bulk, and side-to-side vibration as the printhead scans.

Recently, the present inventor has invented ink jet printer technologies suitable for incorporation in a desktop keyboard, such as:

| | | | | |
|---|---|---|---|---|
| 6,227,652 | 6,213,588 | 6,213,589 | 6,231,163 | 6,247,795 |
| 6,394,581 | 6,244,691 | 6,257,704 | 6,416,168 | 6,220,694 |
| 6,257,705 | 6,247,794 | 6,234,610 | 6,247,793 | 6,264,306 |
| 6,241,342 | 6,247,792 | 6,264,307 | 6,254,220 | 6,234,611 |
| 6,302,528 | 6,283,582 | 6,239,821 | 6,338,547 | 6,247,796 |
| 6,557,977 | 6,390,603 | 6,362,843 | 6,293,653 | 6,312,107 |
| 6,227,653 | 6,234,609 | 6,238,040 | 6,188,415 | 6,227,654 |
| 6,209,989 | 6,247,791 | 09/112,764 | 6,217,153 | 6,416,167 |
| 6,243,113 | 6,283,581 | 6,247,790 | 6,260,953 | 6,267,469 |
| 6,273,544 | 6,309,048 | 6,420,196 | 6,443,558 | 6,439,689 |
| 6,378,989 | 09/425,420 | 09/422,893 | 09/693,703 | 6,406,129 |
| 6,505,916 | 6,457,809 | 6,550,895 | 6,457,812 | 6,428,133 | all of which are incorporated by reference.

These ink jet technologies are suitable for the construction of miniature, low cost pagewidth printers, which can readily fit within a keyboard form factor.

In this specification, the word "computer" is to be understood broadly to cover such apparatus as personal computers, PDA's and the like.

SUMMARY OF THE INVENTION

According to a first aspect of the invention, there is provided a keyboard which comprises a housing that defines a media feed path;

a pagewidth printer arranged in the housing operatively with respect to the media feed path to carry out a printing operation on media passing through the feed path; and a feed mechanism arranged on the housing for feeding media through the feed path.

The housing may be generally rectangular and may define an input slot in one side of the housing and an exit slot in an opposite side of the housing, with the media feed path positioned between the slots.

The printer may include a pagewidth printhead and an ink distribution arrangement positioned on the pagewidth printhead to supply ink to the pagewidth printhead.

The feed mechanism may include an endless belt that is positioned along the media feed path such that the media feed path is substantially planar and a roller assembly to drive the endless belt.

The invention extends to a computer which includes a keyboard as described above.

The fact that the printer is a non-scanning printer provides a mechanism whereby the keyboard is not subjected to vibration during operation. Furthermore, as will be clear from the referenced material above, the printer can be significantly smaller that a scanning printhead, thus facilitating incorporation of such a printer in a keyboard such as a convention personal computer keyboard. Still further, the pagewidth printer is capable of generating images at a speed which is significantly greater than that possible with presently available printers having scanning printheads.

According to a second aspect of the invention, there is provided a keyboard, particularly for use with a computer, the keyboard including a housing;

an alphanumeric keypad carried by the housing; and a page width printer arranged in the housing.

The housing has dimensions approximating those of a standard computer keyboard, the housing having an ejection slot along one, longer side through which print media can be ejected after the printer has printed an image on the print media.

Preferably, the housing includes an input slot along an opposed, longer side for feeding print media to the printer. Typically, the print media is in the form of sheets of paper to be fed to the printer one sheet at a time.

The keyboard may include a feed means arranged in the housing for feeding the print media from the input slot to the printer. The feed means may be arranged within the housing and may be in the form of a belt drive arrangement for feeding the print media to the printer.

Further, the keyboard may include an engaging means arranged intermediate the printer and the ejection slot for feeding the print media out of the ejection slot. Thus, the engaging means may be arranged downstream of the printer and may be in the form of one or more spiked wheels which grip and transport the print media to the ejection slot.

As indicated above, the keyboard is particularly intended for use with a computer. Accordingly, the keypad may include a standard, QWERTY keypad, a numerals keypad and a plurality of control keys.

The housing may include an access opening for enabling an ink supply of the printer to be replenished. A lid in a top surface of the housing may close off the access opening. The ink supply of the printer may include a removable ink cartridge which is accessed through the access opening of the housing.

Preferably, the printer is a full color printer. The printer may be a photo quality printer.

The printhead may comprise an array of nozzles, said array being fabricated by microelectromechanical (MEMS) techniques.

According to a second aspect of the invention, there is provided a computer keyboard which includes a housing having an array of keys carried thereon and defining a chamber;

a pagewidth ink jet printer arranged within the chamber of the housing; and an input slot in one side of the housing for feeding print media to the printer and an ejection slot in an opposed side of the housing through which the print media is ejected after printing.

BRIEF DESCRIPTION OF THE DRAWINGS

The invention is now described by way of example with reference to the accompanying diagrammatic drawings in which.

DETAILED DESCRIPTION OF THE DRAWINGS

Figure 2:
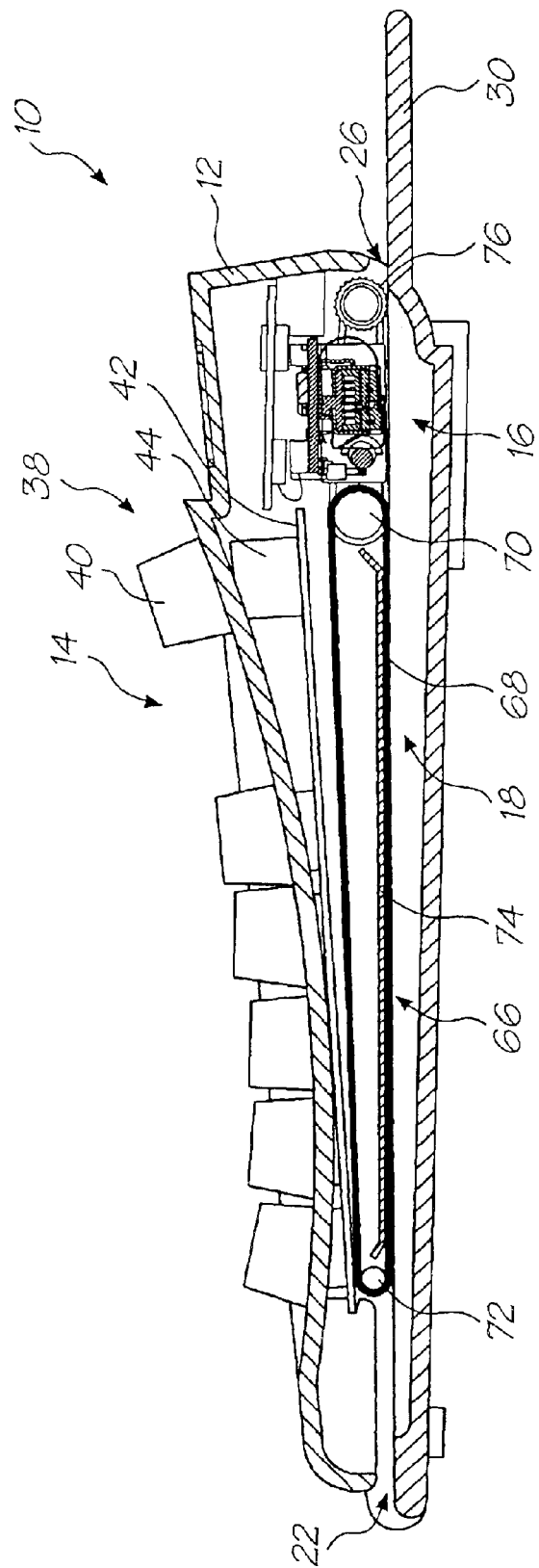
FIG. 2 shows a sectional side view of the keyboard.
Figure 3:
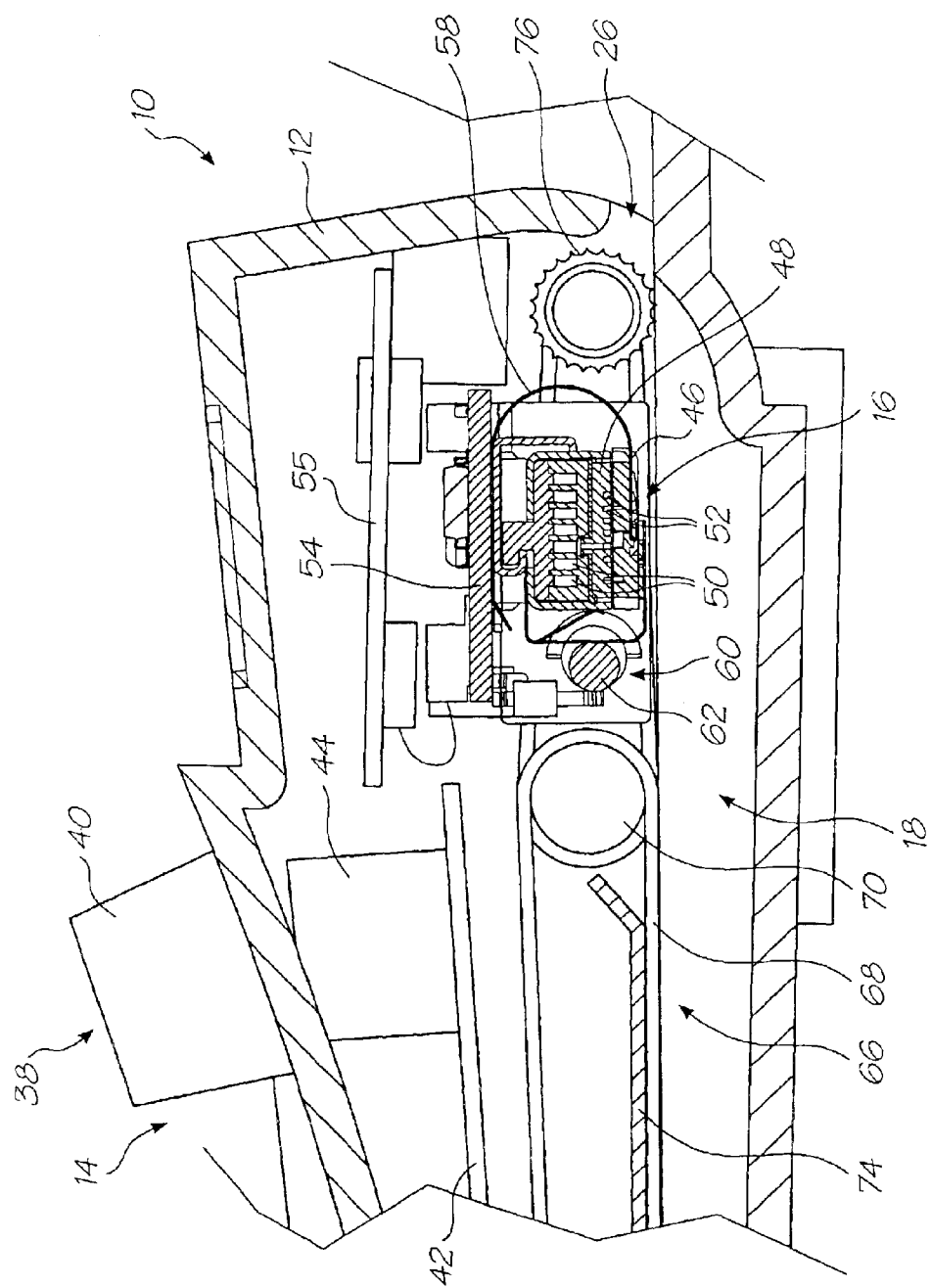
FIG. 3 shows, on an enlarged scale, a sectional side view of part of the keyboard.

In the drawings, reference numeral 10 generally designates a keyboard in accordance with the invention. The keyboard 10 is intended particularly for use with a computer. The keyboard 10 comprises a housing 12 on which a keypad 14 is arranged. A printer 16 (FIGS. 2 and 3) is contained in a chamber 18 defined in the housing 12 of the keyboard 10.

The housing 12 is dimensioned similarly to a conventional computer keyboard and is substantially rectangular when viewed in plan having a pair of opposed, longer sides and a pair of opposed, shorter sides. An input slot 22 is defined in one of the longer sides of the housing 12 for feeding print media in the form of a sheet of paper 24 to the printer 16. Preferably, the input slot 22 is defined in that side of the housing 12 which, in use, is closer to a user of the keyboard 10.

An ejection slot 26 is defined in an opposed, longer side of the housing through which the sheet of print media, incorporating an image 28, is ejected after completion of printing. An exit tray 30 extends outwardly from the ejection slot 26 on to which the sheet of paper 24 is fed after printing.

The keypad 14 includes an array if keys 38 arranged in a QWERTY keypad 32, a numerals keypad 34 and a plurality of control keys 36. Each key 38 of the keypad 14 includes a key cap 40 which communicates with a keyboard circuit board 42 (FIGS. 2 and 3) through an opening in a top surface of the housing 12. The key caps 40 engage key switches 44 mounted on the circuit board 42.

The printer 16 comprises a page width ink jet printhead 46 mounted in a support 48. The printhead 46 is a multi-color printhead for printing photo quality images 28. Accordingly, the support 48 includes a plurality of galleries 50, each of which contains a different color ink to be fed via passages 52 to the printhead 46.

Figure 1:
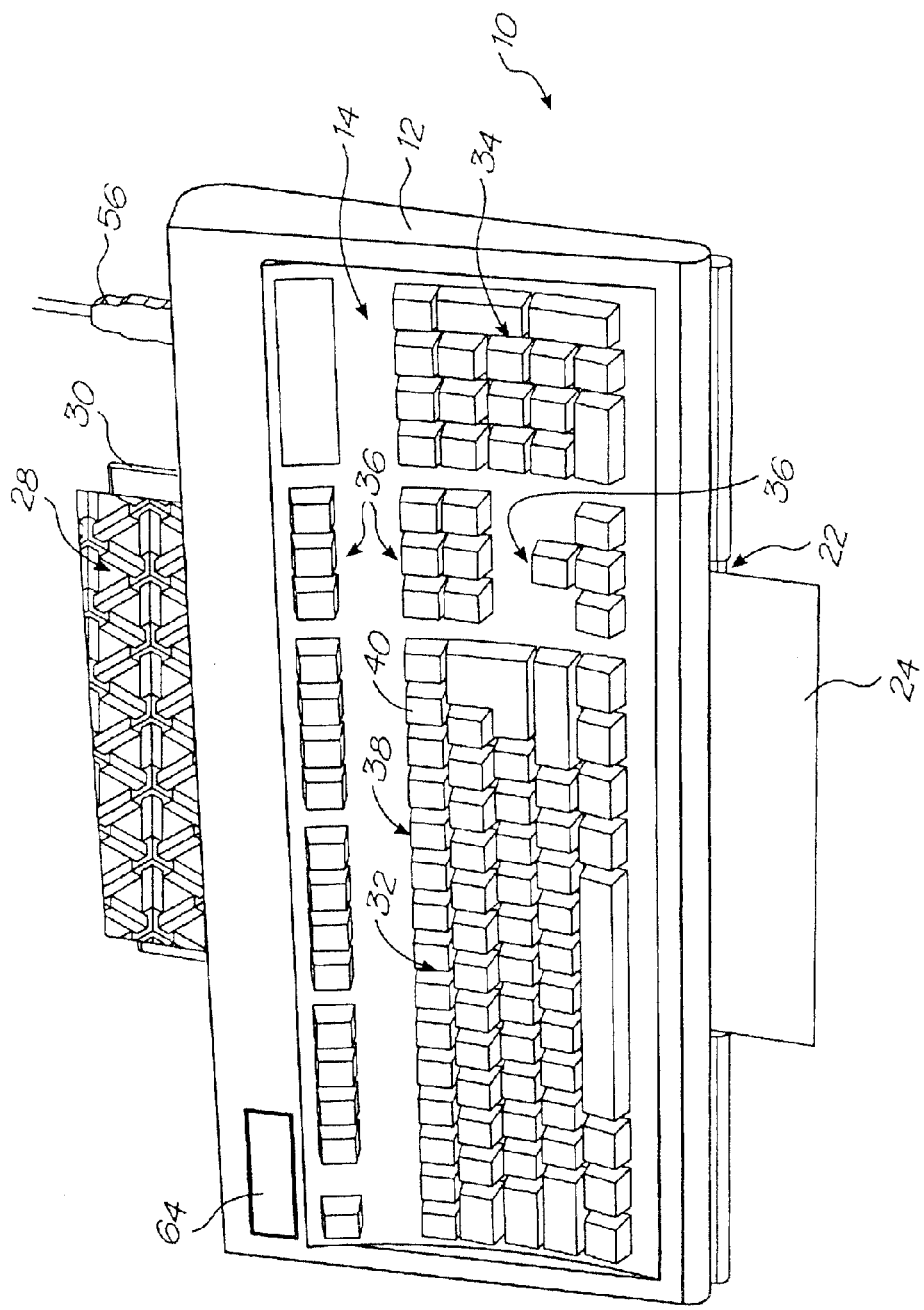
FIG. 1 shows a three dimensional view of a keyboard, in accordance with the invention.

The printer 16 includes a controller printed circuit board (PCB) 55. The PCB 55 receives printing commands from the computer (not shown) via a USB connector 56 (FIG. 1). A printhead PCB 54 communicates with the printhead 46 via a TAB automated bond film 58 or any other suitable, flexible film. The controller PCB 55 connects to the printhead PCB 54 via a flexible film.

A retaining device, in the form of a locking member 60, releasably locks the printer 16 in position in the chamber 18 of the housing 12. The locking device 60 includes a cam-like locking member 62.

Further, the printer 16 includes an ink supply cartridge (not shown) for feeding ink to the galleries 50 of the printhead support 48. The ink supply cartridge is accessed through an opening, closed off by a lid 64 (FIG. 1), in a top surface of the housing 12 to replace the cartridge when its supply of ink has been depleted.

The keyboard 10 includes a feed mechanism 66 for feeding the sheet of paper 24 to the printer 16. The feed mechanism 66 comprises an endless belt 68 which is rotated by a drive roller 70 and extends about an opposed, idler roller 72. A planar member in the form of a sprung metal plate 74 bears against the belt 68 to maintain the planarity of the belt 68 and, accordingly, the sheet of paper 24.

An engaging means, in the form of at least one spiked wheel 76, is arranged intermediate the printer 16 and the ejection slot 26. The, or each, spiked wheel 76 engages the sheet of paper 24, after printing of the image 28, and feeds the sheet of paper 24 through the ejection slot 26 to be accessed by the user.

In use, when an image 28 is to be printed, the user inserts a sheet of paper into the keyboard through the input slot 22 where it is fed to the printer 16 by the feed arrangement 66. By means of an appropriate command via the computer, the information or image to be printed is fed to the printer 16 via the USB connector 56 and the controller PCB 55. The printer 16 is controlled by the PCB 55 to print the image 28 on the sheet of paper 24 and to cause ejection of the sheet of paper 24 together with its printed image 28 thereon through the ejection slot 26.

It is an advantage of the invention that a computer peripheral is provided which enables a person rapidly to obtain copies of images while seated before the person's computer. In this regard, it is to be noted that the printer 16 is a high-speed printer which can print at rates of up to 30 pages per minute. Hence, the need for using a communal workstation is obviated. In addition, the incorporation of the printer within the keyboard 10 considerably reduces the space required for a computer together with its peripherals and, in so doing, providing more space to a user. It will be appreciated that this can be of major benefit where the workstation is a confined working space.

We claim:

1. A keyboard for a computer system comprising a housing that defines a media feed path;

an external port on the housing for connecting the keyboard to a separately housed computer via a connector;

a pagewidth printer arranged in the housing operatively with respect to the media feed path to carry out a printing operation on media passing through the feed path; and a feed mechanism arranged on the housing for feeding media through the feed path.

2. A keyboard as claimed in claim 1 in which the housing is generally rectangular and defines an input slot in one side of the housing and an exit slot in an opposite side of the housing, with the media feed path positioned between the slots.

3. A keyboard as claimed in claim 1, in which the printer includes a pagewidth printhead and an ink distribution arrangement positioned on the pagewidth printhead to supply ink to the pagewidth printhead.

4. A keyboard as claimed in claim 1, in which the feed mechanism includes an endless belt that is positioned along the media feed path such that the media feed path is substantially planar, and a roller assembly to drive the endless belt.

5. A computer system comprising:

a computer;

keyboard as claimed in claim 1; and a connector connecting the computer to the keyboard.

* * * * *